United States Patent [19]

Hatta

[11] Patent Number: 5,778,010
[45] Date of Patent: Jul. 7, 1998

[54] METHOD AND DEVICE FOR CORRECTING PACKET DATA ERROR AND PACKET RECEIVER

[75] Inventor: Koichi Hatta, Kawasaki, Japan

[73] Assignee: Fujitsu Ltd., Kawasaki, Japan

[21] Appl. No.: 763,111

[22] Filed: Dec. 10, 1996

[30] Foreign Application Priority Data

Jun. 27, 1996 [JP] Japan ................... 8-167060

[51] Int. Cl.⁶ .................... H04L 7/08; H03M 13/00
[52] U.S. Cl. .......................... 371/37.02; 375/365
[58] Field of Search ................... 371/30, 37.01, 371/42, 37.02; 375/365

[56] References Cited

U.S. PATENT DOCUMENTS

| 4,649,543 | 3/1987 | Levine | 371/41 |
| 5,610,983 | 3/1997 | Stewart | 380/48 |

OTHER PUBLICATIONS

"Code Theory", Hideki IMAI, Mar. 15, 1990.

*Primary Examiner*—Stephen M. Baker
*Attorney, Agent, or Firm*—Staas & Halsey

[57] ABSTRACT

A replacement control circuit 30, having a synchronization pattern monitoring circuit 31, an acquisition circuit 32, a tracking circuit 33, an RS flip-flop 34 and an AND gate 35, judges whether receive data D3 is in synchronization or not, counts a clock CLK corresponding to a byte of the receive data D3, and while the receive data D3 is judged to be in synchronization, generates a replacement control signal S5 that becomes active at a synchronization pattern location of each packet. When the replacement control signal S5 is active, a selection circuit 43 selects synchronization pattern P1 generated by a synchronization pattern generation circuit 42. When the replacement control signal S5 is inactive, the selection circuit 43 selects the receive data D3. The output of the selection circuit 43 is corrected by a byte error correction circuit in units of packets.

6 Claims, 5 Drawing Sheets

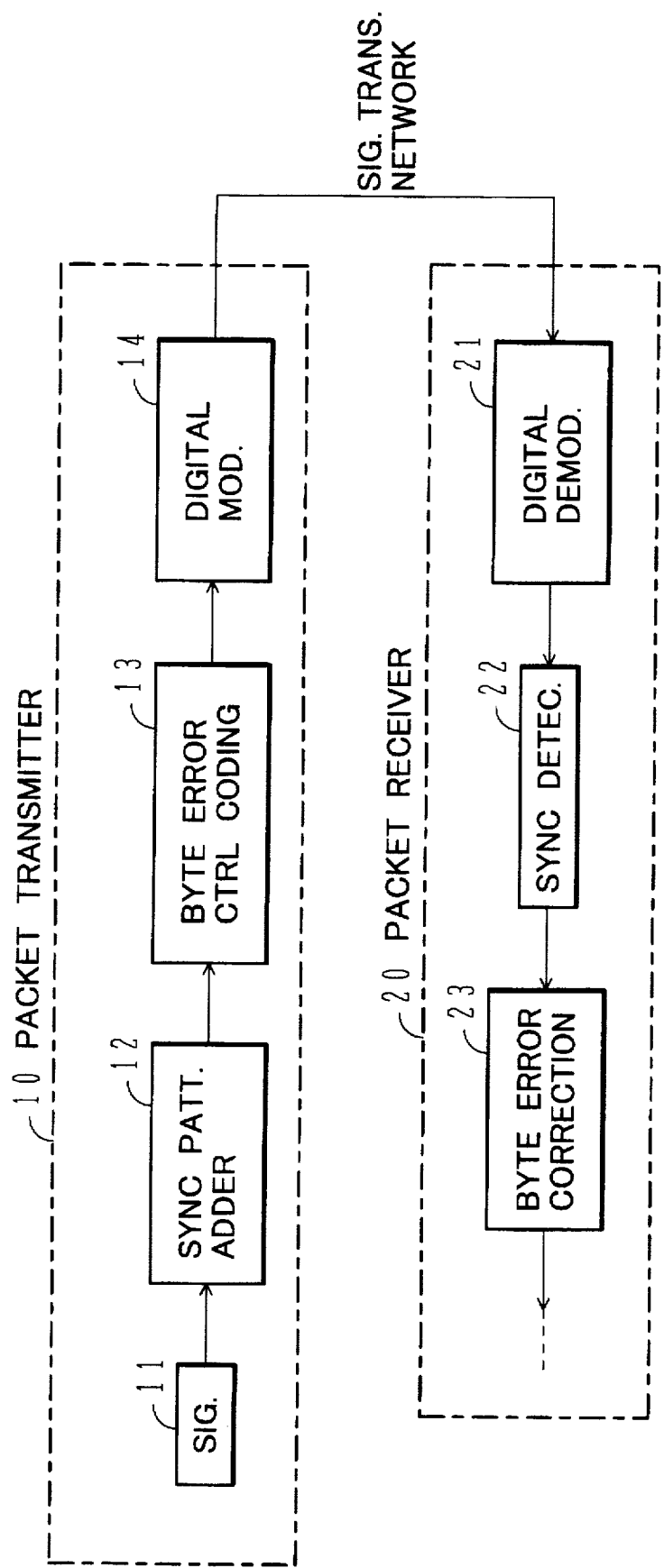

5,778,010

METHOD AND DEVICE FOR CORRECTING PACKET DATA ERROR AND PACKET RECEIVER

BACKGROUND OF THE INVENTION

1. Field of the Invention

The present invention relates to method and device for correcting a packet data error and a packet receiver.

2. Description of the Related Art

FIG. 4 shows the main part block diagram of a conventional packet communication device such as a digital broadcasting communication device.

In a packet transmitter 10, video or audio data D0 are output from a signal source 11 and provided to a synchronization pattern addition circuit 12. The synchronization pattern addition circuit 12 divides data D0 into 187-byte blocks as shown in FIG. 5(A), adds a fixed synchronization pattern P1 to the beginning of each block, and outputs it as data D1 with each block consisting of 188 bytes. In FIG. 5(A) and 5(B), the synchronization pattern P1 is hexadecimal numeral '47'. A byte error control coding circuit 13 adds a byte error control code P2 of 16 bytes to the end of each block for data D1 as shown in FIG. 5(B), and outputs it as send data D2 with each packet consisting of 204 bytes. A digital modulation circuit 14 modulates send data D2 by transforming each bit of send data D2 into signals with different amplitudes, frequencies or phases for '1' and '0' to send the data remotely.

The modulated signal is provided to a packet receiver 20 via a signal transmission network of cable or radio. A bit error occurs mainly in the signal transmission line between the packet transmitter 10 and the packet receiver 20.

In the packet receiver 20, modulated send data are demodulated by a digital demodulation circuit 21 and provided to a synchronous detection circuit 22 as receive data D3. The synchronous detection circuit 22 enters a through state when it judges that receive data D3 is in synchronization and provides the receive data D3 as D4 to a byte error correction circuit 23, or invalidates the output when it judges that the receive data D3 is out of synchronization.

If the byte error control code P2 is the Reed-Solomon code of 16 bytes, the byte error correction circuit 23 operates as follows in regard to each packet of 204 bytes with synchronization pattern P1 added as the first byte:

(1) If the number of error bytes is eight or less, the circuit 23 can correct it.

(2) If the number of error bytes is 9 to 16, the circuit 23 cannot correct an error, but can judge the occurrence of the error.

(3) If the number of error bytes is 17 or more, the circuit 23 cannot even judge the occurrence of an error.

The number of bytes of the byte error control code P2 can be increased to improve the error correction ability. However, the transmission efficiency deteriorates in this case. The number of bytes of the byte error control code P2 is determined usually, and under this condition it is preferable to correct as many transmission errors as possible.

SUMMARY OF THE INVENTION

Accordingly, an object of the present invention is to provide method and device for correcting a packet data error and a packet receiver that enables the correction of transmission errors as many as possible without increasing the number of bytes of the error control code.

According to the 1st aspect of the present invention, there is provided a method of correcting a packet data error in receive data in units of packets, the receive data containing a synchronization pattern and a control code in each packet, the method comprising the steps of: judging whether the receive data is in synchronization or not based on the synchronization pattern in the receive data; replacing part of the receive data with a generated synchronization pattern at a synchronization pattern location in the receive data for each packet of the receive data while the receive data is judged to be in the synchronization; and correcting the receive data replaced partially, in units of packets.

With the 1st aspect, even if the synchronization pattern contained in receive data has an error, it is replaced by a correct synchronization pattern while the receive data is in synchronization, and therefor the synchronization pattern is not subject to error correction and more transmission errors can be corrected without increasing the number of bytes of the error control code.

In the 1st mode of the 1st aspect of the present invention, the step of judging comprises the steps of: judging whether the synchronization pattern in the receive data is detected consecutively for m times or not; judging whether the synchronization pattern in the receive data is undetected consecutively for n times or not; and judging that the receive data is in synchronization during a period from judging the synchronization pattern to be detected consecutively for the m times until judging the synchronization pattern not to be detected consecutively for the n times.

According to the 2nd aspect of the present invention, there is provided a device for correcting a packet data error in receive data in units of packets, the receive data containing a synchronization pattern and a control code in each packet, the device comprising: replacement control circuit for judging whether the receive data is in synchronization or not based on the synchronization pattern in the receive data and for generating a replacement control signal that becomes active at a synchronization pattern location for each packet of the receive data while the receive data is judged to be in the synchronization; a synchronization pattern generation circuit; a selection circuit for selecting and providing a synchronization pattern generated by the synchronization pattern generation circuit when the replacement control signal is active and for selecting and providing the receive data when the replacement control signal is inactive; and an error correction circuit for correcting an output of the selection circuit in units of packets.

In the 1st mode of the 2nd aspect of the present invention, the replacement control circuit comprises: a synchronization pattern monitoring circuit for judging whether the synchronization pattern exists or not at a location in each packet of the receive data; an acquisition circuit for judging whether the synchronization pattern in the receive data is detected consecutively for m times or not; a tracking circuit for judging whether the synchronization pattern in the receive data is undetected consecutively for n times or not; and a circuit for judging that the receive data is in synchronization during a period from judging the synchronization pattern to be detected consecutively for the m times until judging the synchronization pattern not to be detected consecutively for the n times.

According to the 3rd aspect of the present invention, there is provided a packet receiving device comprising: a digital demodulation circuit for demodulating send data containing a synchronization pattern and an error control code in each packet into receive data; a replacement control circuit for judging whether the receive data is in synchronization or not based on the synchronization pattern in the receive data and for generating a replacement control signal that becomes active at a synchronization pattern location for each packet of the receive data while the receive data is judged to be in the synchronization; a synchronization pattern generation circuit; a selection circuit for selecting and providing a synchronization pattern generated by the synchronization pattern generation circuit when the replacement control signal is active and for selecting and providing the receive data when the replacement control signal is inactive; and an error correction circuit for correcting an output of the selection circuit in units of packets.

In the 1st mode of the 3rd aspect of the present invention, the replacement control circuit comprises: a synchronization pattern monitoring circuit for judging whether the synchronization pattern exists or not at a location in each packet of the receive data; an acquisition circuit for judging whether the synchronization pattern in the receive data is detected consecutively for m times or not; a tracking circuit for judging whether the synchronization pattern in the receive data is undetected consecutively for n times or not; and a circuit for judging that the receive data is in synchronization during a period from judging the synchronization pattern to be detected consecutively for the m times until judging the synchronization pattern not to be detected consecutively for the n times.

BRIEF DESCRIPTION OF THE DRAWINGS

FIG. 4 is a schematic block diagram showing the main part of a prior art packet communication device.

DESCRIPTION OF THE PREFERRED EMBODIMENT

Figure 1:
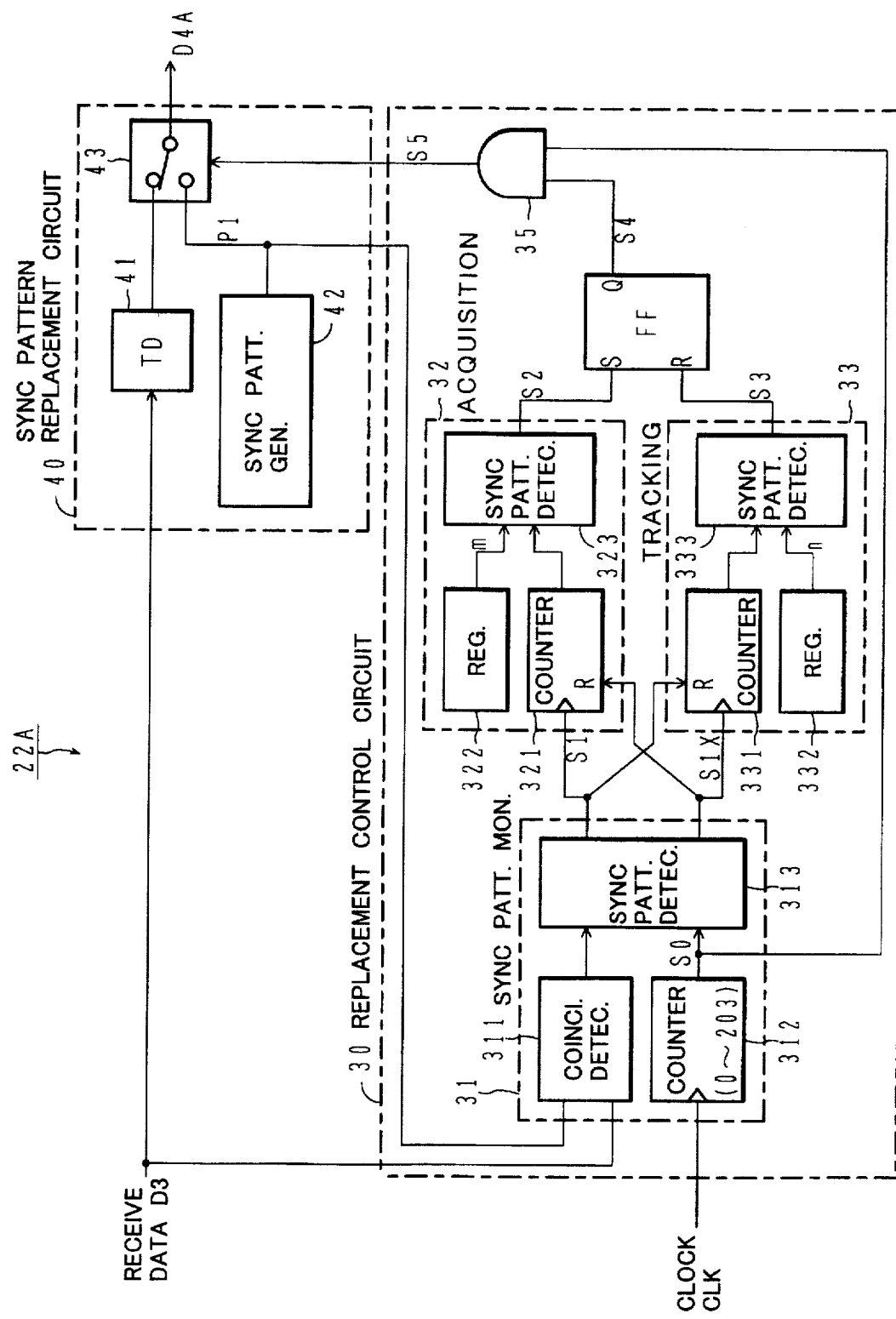
FIG. 1 is a schematic block diagram showing a synchronization detection and replacement circuit of an embodiment according to the present invention.

Referring now to the drawings, a packet communication device that is a preferred embodiment in accordance with the present invention, is described below. One packet is assumed to consist of 204 bytes as described above.

This device, in FIG. 4, uses a synchronization detection and replacement circuit 22A of FIG. 1 instead of a synchronization detection circuit 22 of FIG. 4. The synchronization detection and replacement circuit 22A has a replacement control circuit 30 and a synchronization pattern replacement circuit 40. The replacement control circuit 30 has a synchronization pattern monitoring circuit 31, an acquisition circuit 32, a tracking circuit 33, an RS flip-flop 34, and an AND gate 35. The synchronization pattern replacement circuit 40 has a delay circuit 41, a synchronization pattern generation circuit 42, and a selection circuit 43.

The synchronization pattern monitoring circuit 31 has a coincidence detection circuit 311, a counter 312, and a synchronization pattern detection circuit 313.

The coincidence detection circuit 311 detects whether receive data D3 coincides with specific synchronous pattern P1.

The counter 312 counts clock CLK. When the counted value reaches decimal number 203, next it returns to 0. The counter 312 outputs signal S0 that becomes high state '1' only when the counted value is 0. The clock CLK is generated by a digital demodulation circuit 21 of FIG. 4. The clock cycle is equal to the byte cycle of receive data D3 and the pulse rise time of the clock CLK is coincident with byte change time in receive data D3. The counter 312 is cleared to zero, for example, when the coincidence detection circuit 311 first detects coincidence.

The synchronization pattern detection circuit 313 sets the synchronization pattern detection signal S1 to high state '1' when the coincidence detection circuit 311 detects coincidence and at the same time the output signal SO of the counter 312 is at high state '1'. The synchronization pattern detection circuit 313 sets the synchronization pattern non-detection signal S1X to high state '1' when the coincidence detection circuit 311 does undetect coincidence and at the same time the output signal S0 of the counter 312 is at low state '0'. In other cases, the synchronization pattern detection circuit 313 sets the synchronization pattern detection signal S1 and synchronization pattern non-detection signal S1X to low state '0'.

The acquisition circuit 32 has a counter 321, a register 322, and a coincidence detection circuit 323.

The counter 321 counts the pulse of the synchronization pattern detection signal S1, and is cleared to zero when the synchronization pattern non-detection signal S1X becomes high state '1'. Value m is set in the variable setting register 322. The coincidence detection circuit 323 sets the coincidence detection signal S2 to high state '1' only when the counted value of the counter 321 becomes the same as m.

Therefore, the acquisition circuit 32 judges that data D3 became in synchronization when it detects m pulses of the synchronization pattern detection signal S1 consecutively at intervals of 204 bytes. The acquisition circuit 32 then activates the coincidence detection signal S2.

The tracking circuit 33 has a counter 331, a register 332, and a coincidence detection circuit 333.

The counter 331 counts pulses of the synchronization pattern non-detection signal S1X, and is cleared to zero when the synchronization pattern detection signal S1 becomes high state '1'. Value n is set in the variable setting register 332. The coincidence detection circuit 333 sets the coincidence detection signal S3 to high state '1' only when the counted value of the counter 331 becomes the same as n. Therefore, the tracking circuit 33 judges that data D3 became out of synchronization when it detects n pulses of the synchronization pattern non-detection signal S1X consecutively at intervals of 204 bytes. The tracking circuit 33 then activates the coincidence detection signal S3.

The RS flip-flop 34 is set by the activation of the coincidence detection signal S2 and is reset by the activation of the coincidence detection signal S3. Therefore, the output signal S4 of the D flip-flop 34 remains at high state '1' only while receive data D3 is in synchronization.

The AND gate 35 outputs logical AND of the signals S0 and S4 as a replacement control signal S5. Therefore, the replacement control signal S5 remains at high state '1' only at the synchronization pattern location of the receive data D3 while the receive data D3 is in synchronization.

On the other hand, in the synchronization pattern replacement circuit 40, the delay circuit 41 delays receive data D3 in order to adjust the timing of the synchronization pattern location in the receive data D3 and replacement control signal S5. The selection circuit 43 selects output of the delay circuit 41 when the replacement control signal S5 is at low state '0' or output of the synchronization pattern generation circuit 42 when the replacement control signal S5 is at high state '1'.

Therefore, while the replacement control signal S5 is at low state '0', the receive data D3 runs as receive data D4A via the delay circuit 41 and the selection circuit 43. While the replacement control signal S5 is at high state '1', the synchronization pattern P1 from the synchronization pattern generation circuit 42 runs as receive data D4A via the selection circuit 43.

The output signal D4A of the selection circuit 43 is supplied to a byte error correction circuit 23 of FIG. 4.

Figure 2A:
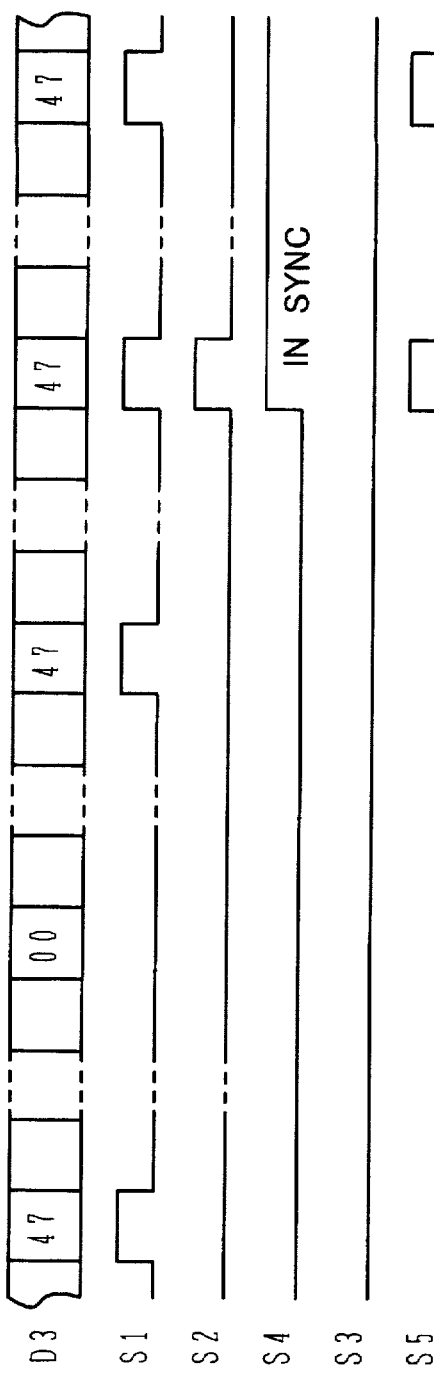
FIGS. 2(A) and 2(B) are schematic charts of the operation performed by the circuit shown in FIG. 1.
Figure 2B:
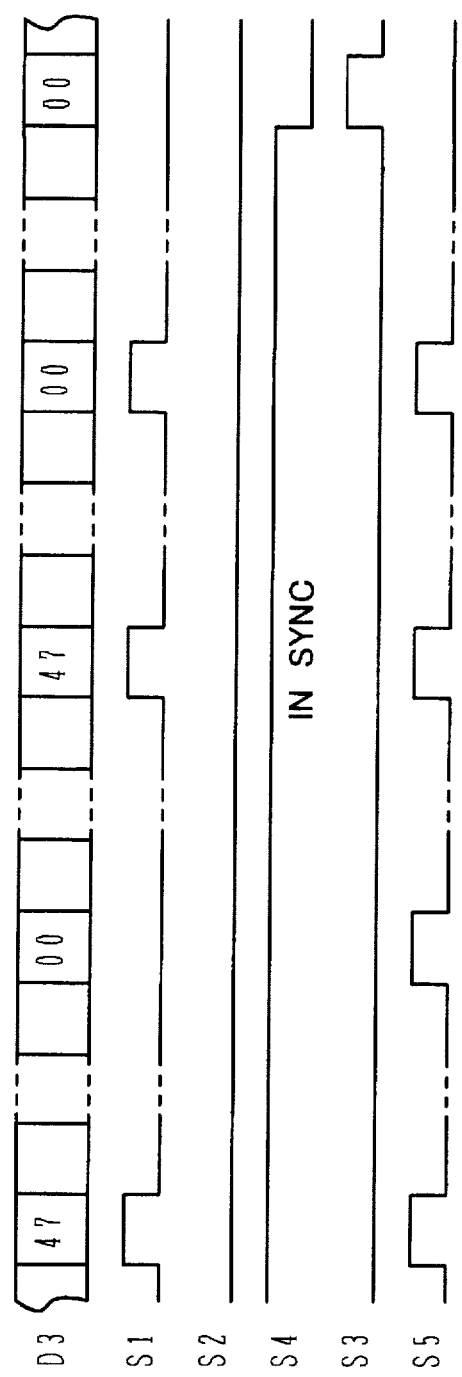

FIGS. 2(A) and 2(B) show the operation of the circuit of FIG. 1. FIG. 2(A) shows the area near to the start of synchronization. FIG. 2(B) shows the area near to the end of synchronization. In FIGS. 2(A) and 2(B), the signal propagation delay is ignored for simplification and therefore signals S1 to S5 are described in accordance with the receive data D3. In FIGS. 2(A) and (B), hexadecimal numeral '47' is the synchronization pattern P1 and the case of m=n=2 is shown.

Figure 3:
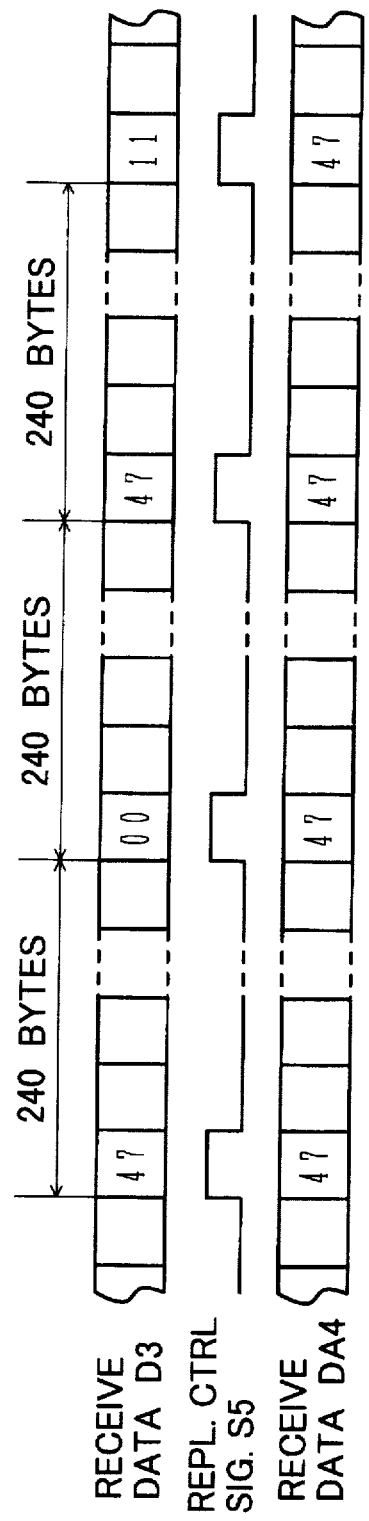
FIG. 3 is an illustration of the effect of the embodiment.
Figure 5A:
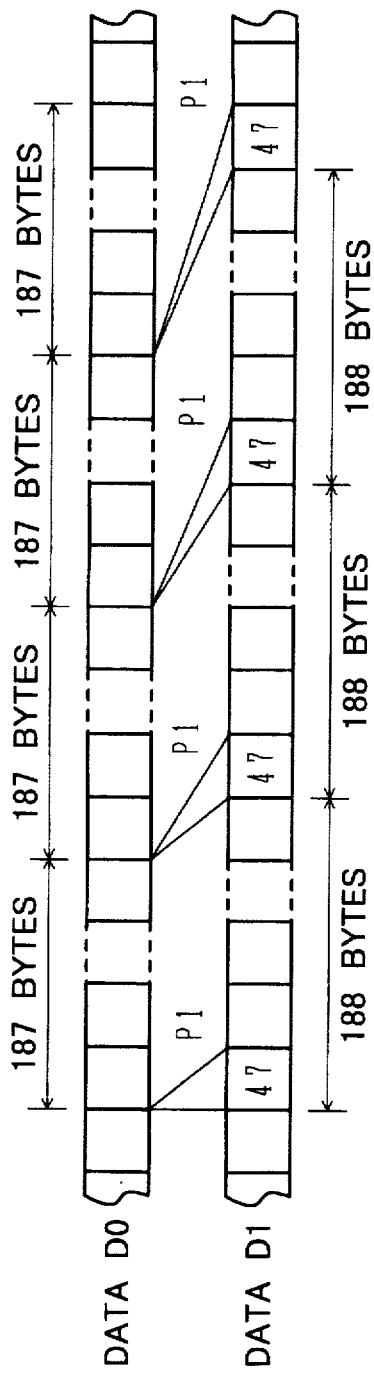
FIGS. 5(A) and 5(B) are illustrations of making packet format send data.
Figure 5B:
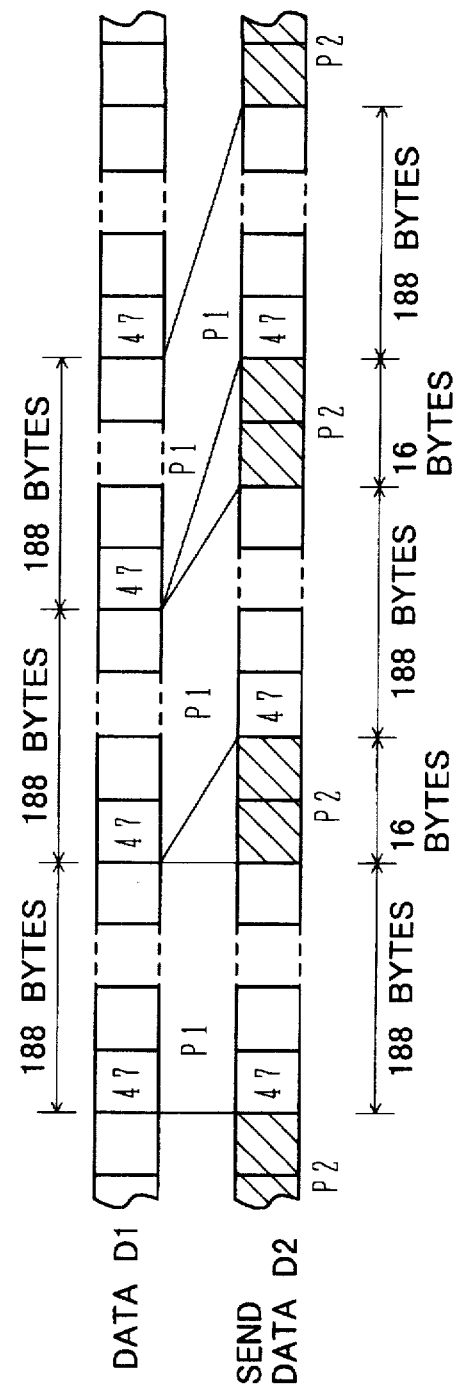

While the data is in synchronization, even if there is an error in the synchronization pattern contained in the receive data D3, it is replaced by the correct pattern P1 as shown in FIG. 3.

If the byte error control code P2 is a non-binary BHC code of 16 bytes (the number of check codes is 16), for example, a Reed-Solomon code (refer to "Code Theory" of Hideki Imai, published by the Electric Information Communication Association in Japan), the byte error correction circuit 23 of FIG. 4 operates as follows in regard to each 204 bytes with the synchronization pattern P1 added as the first byte:

(1) If the number of error bytes is eight or less, the circuit 23 can correct the error.

(2) If the number of error bytes is 9 to 16, the circuit 23 cannot correct the error, but can judge the occurrence of the error.

(3) If the number of error bytes is 17 or more, the circuit 23 cannot even judge the occurrence of an error.

The synchronization pattern P1 has no error because it is replaced as described above, and so the synchronization pattern is not subject to error correction in this embodiment. As a result, the above 204 bytes become essentially 203 bytes excluding the synchronization pattern P1, and so the error correction ability can be improved without increasing the number of bytes of the byte error control code.

Although preferred embodiment of the present invention has been described, it is to be understood that the invention is not limited thereto and that various changes and modifications may be made without departing from the spirit and scope of the invention.

What is claimed is:

1. A method of correcting a packet data error in receive data in units of packets, said receive data containing a synchronization pattern and a control code in each packet, said method comprising the steps of:

judging whether said receive data is in synchronization or not based on said synchronization pattern in said receive data;

replacing part of said receive data with a generated synchronization pattern at a synchronization pattern location in said receive data for each packet of said receive data while said receive data is judged to be in said synchronization; and correcting said receive data replaced partially, in units of packets.

2. A method according to claim 1, wherein said step of judging comprises:

judging whether said synchronization pattern in said receive data is detected consecutively for m times or not;

judging whether said synchronization pattern in said receive data is undetected consecutively for n times or not; and judging that said receive data is in synchronization during a period from judging said synchronization pattern to be detected consecutively for said m times until judging said synchronization pattern not to be detected consecutively for said n times.

3. A device for correcting a packet data error in receive data in units of packets, said receive data containing a synchronization pattern and a control code in each packet, said device comprising:

replacement control circuit for judging whether said receive data is in synchronization or not based on said synchronization pattern in said receive data and for generating a replacement control signal that becomes active at a synchronization pattern location for each packet of said receive data while said receive data is judged to be in said synchronization;

a synchronization pattern generation circuit;

a selection circuit for selecting and providing a synchronization pattern generated by said synchronization pattern generation circuit when said replacement control signal is active and for selecting and providing said receive data when said replacement control signal is inactive; and an error correction circuit for correcting an output of said selection circuit in units of packets.

4. A device according to claim 3, wherein said replacement control circuit comprises:

a synchronization pattern monitoring circuit for judging whether said synchronization pattern exists or not at a location in each packet of said receive data;

an acquisition circuit for judging whether said synchronization pattern in said receive data is detected consecutively for m times or not;

a tracking circuit for judging whether said synchronization pattern in said receive data is undetected consecutively for n times or not; and a circuit for judging that said receive data is in synchronization during a period from judging said synchronization pattern to be detected consecutively for said m times until judging said synchronization pattern not to be detected consecutively for said n times.

5. A packet receiving device comprising:

a digital demodulation circuit for demodulating send data containing a synchronization pattern and an error control code in each packet into receive data;

a replacement control circuit for judging whether said receive data is in synchronization or not based on said synchronization pattern in said receive data and for generating a replacement control signal that becomes active at a synchronization pattern location for each packet of said receive data while said receive data is judged to be in said synchronization;

a synchronization pattern generation circuit;

a selection circuit for selecting and providing a synchronization pattern generated by said synchronization pattern generation circuit when said replacement control signal is active and for selecting and providing said receive data when said replacement control signal is inactive; and an error correction circuit for correcting an output of said selection circuit in units of packets.

6. A device according to claim 5, wherein said replacement control circuit comprises:

a synchronization pattern monitoring circuit for judging whether said synchronization pattern exists or not at a location in each packet of said receive data;

an acquisition circuit for judging whether said synchronization pattern in said receive data is detected consecutively for m times or not;

a tracking circuit for judging whether said synchronization pattern in said receive data is undetected consecutively for n times or not; and a circuit for judging that said receive data is in synchronization during a period from judging said synchronization pattern to be detected consecutively for said m times until judging said synchronization pattern not to be detected consecutively for said n times.

* * * * *